Dec. 27, 1949     L. J. MENGES     2,492,308
TENDERIZING METHOD AND APPARATUS
Filed May 14, 1946
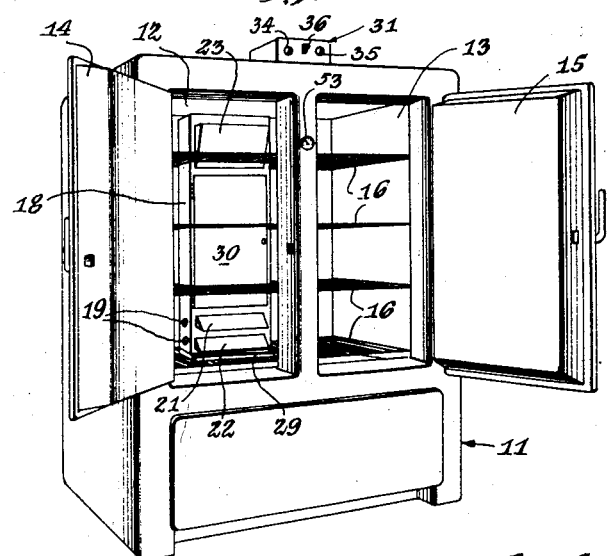
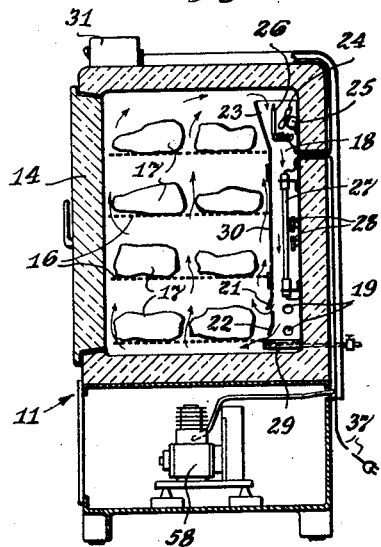
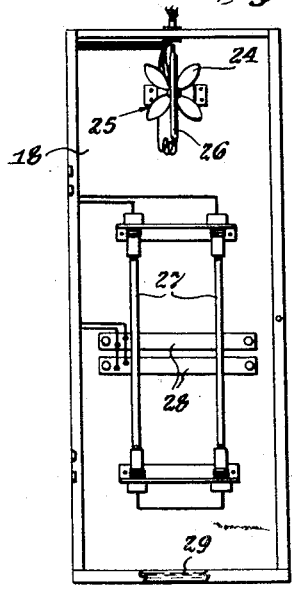
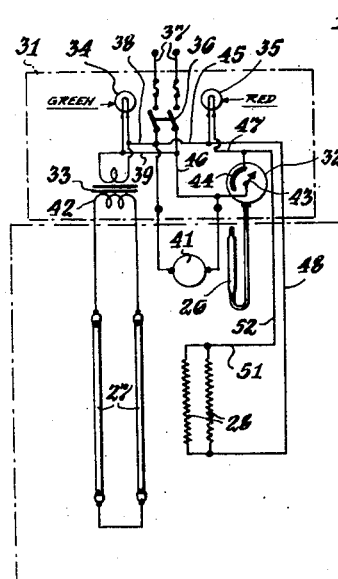
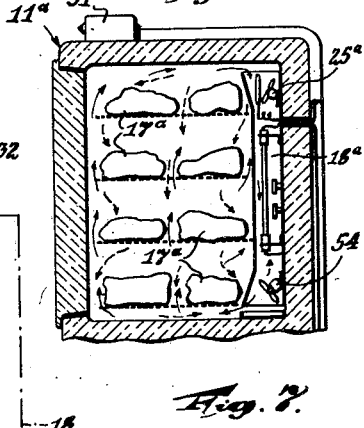
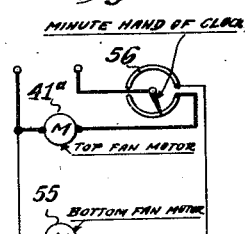
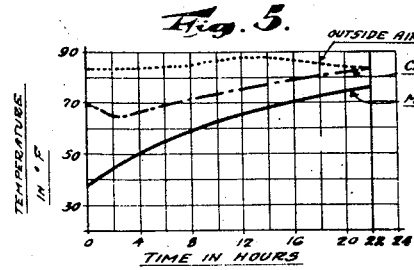
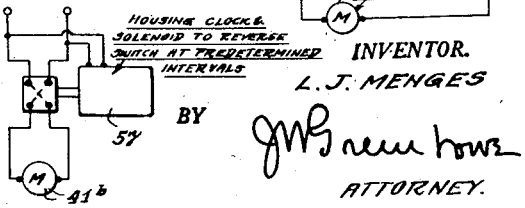
INVENTOR.
L. J. MENGES
BY
ATTORNEY.

Patented Dec. 27, 1949

2,492,308

UNITED STATES PATENT OFFICE 2,492,308

TENDERIZING METHOD AND APPARATUS

Louis J. Menges, Montclair, N. J., assignor to Westinghouse Electric Corporation, East Pittsburgh, Pa., a corporation of Pennsylvania Application May 14, 1946, Serial No. 669,637

6 Claims. (Cl. 99—194)

1

This invention relates to a method and apparatus for tenderizing meat and particularly cuts of beef.

The principal object of my invention generally considered is to tenderize meat, and particularly cuts of beef, by placing such, while in chilled condition, in a cabinet operating with or without refrigeration, where a relatively high temperature, high humidity and air circulation are controlled and maintained, while employing germicidal ultra-violet radiant energy to prevent spoilage.

Another object of my invention is to provide a cabinet, preferably insulated like that of a refrigerator, and having one or more access openings closed by a door or doors, an air duct at the back, air sterilizing means mounted in said duct, thermostatically controlled heating means, and a fan or other means for causing air to circulate through said duct and be discharged either below meat contained in said cabinet, or alternately above and below such meat, while the same is being tenderized.

A further object of my invention is to provide a tenderizing cabinet having an air-circulating duct, the top of said duct being outwardly flared to form a baffle shield to deflect returned air above the center of the fan blades, said duct enclosing a heater, and thermostatic means to cut said heater in and out as the air temperature falls and rises with respect to a predetermined normal cabinet temperature.

A still further object of my invention is to provide a method for treating meat comprising chilling to a normal preserving temperature, enclosing said meat in an insulated cabinet, circulating the air in said cabinet over sterilizing means and said meat for about 22 hours, while heating said air when necessary to maintain its temperature above 60° F., and then again chilling said meat to a normal preserving temperature.

Other objects and advantages of the invention will become apparent as the description proceeds.

Referring to the drawings:

Fig. 1 is a perspective view of a cabinet embodying my invention.

Fig. 2 is a transverse sectional view, partly in end elevation, of such a cabinet.

Fig. 3 is an enlarged elevational view of the apparatus enclosed in the air duct of said cabinet.

Fig. 4 is a wiring diagram.

Fig. 5 is a typical chart showing temperature variations during a tenderizing cycle.

2

Fig. 6 is a fragmentary view corresponding to Fig. 2, but showing a modification.

Fig. 7 is a fragmentary portion of a wiring diagram, modified as compared with that of Fig. 4.

Fig. 8 is a fragmentary portion of a wiring diagram, corresponding to Fig. 7, but showing an additional embodiment.

Referring to the drawing in detail, like parts being designated by like reference characters, and first considering the embodiment of my invention illustrated in Figs. 1 to 4, inclusive, there is shown a cabinet 11 which may be insulated like a normal refrigerating cabinet, with additions which will be described, except that it need not involve refrigerating machinery.

In the present embodiment, the cabinet desirably has an interior or meat-compartment size of 50" wide, 25½" deep and 46½" high, providing a net capacity of about 35 cubic feet. Access openings 12 and 13 are provided, closed respectively by doors 14 and 15. Shelves or racks 16 are used for holding rib and loin cuts of beef or the like 17, providing a capacity of about 400 lbs.

At the center of the back inside wall, a blower baffle-box or air conduit 18 of special design is mounted, so as to discharge supply air at the bottom, as through four holes 19, two on each side of the box, and also through louver-type grilles 21 and 22 in the front. At the top of the box 18 is a baffle shield 23 designed to deflect the returned air above the center of blades 24 of an electric air circulating fan 25.

Between the baffle shield 23 and the baffle blower box grille 21, is mounted a temperature-responsive device having a capillary tube 26 through which a fluid acts on a thermostat when the air temperature in the cabinet rises or falls above or below a predetermined normal temperature-control setting. Inside the baffle blower box are two ultra-violet generating lamps 27, preferably of the WL 782 type, 10" germicidal lamps. These lamps are mounted to irradiate the passing air and thus inhibit the growth of bacteria and mold. The box 18 desirably has an access opening, normally closed by a door 30, and allowing for the convenient installation and replacement of the lamps 27.

In back of the lamps 27 are mounted on insulators two 250 watt strip heaters 28, preferably having a maximum sheath temperature of 750° F. These heaters are connected so as to cut in and out by thermostatic control when predetermined air temperature changes occur inside the cabinet. At the base or lower part of the blower box 18 is a trough 29 for holding water used for humidifying the air inside the cabinet. Outside the cabinet, desirably centrally mounted, is a control box 31 which encases a thermostat control 32 and lamp transformer 33. On the control box is a green pilot light 34 and a red pilot light 35, as well as a main snap switch 36 and a power line 37.

The functioning of the lights, switch and thermostat is as follows: When the main snap switch 36 is closed, after loading the cabinet with chilled meat, the green pilot light 34 is energized through conductors 38 and 39, as indicated in Fig. 4, and will light up. This shows that the fan 25, the motor 41 of which is only diagrammatically illustrated, as well as the lamps 27, energized through the secondary winding 42 of the transformer 33, are operating.

When the temperature of the air inside the cabinet, cooled by the chilled meat, drops below a predetermined temperature such as 65° F., the thermostat-controlled hand 43 will make contact with a conducting strip 44 and energize the strip heaters 28 through lines 45, 48, 51, 52 and 46, and the red lamp 35 through conductors 45, 47 and 46, showing that the thermostat has cut in. These strip heaters function to bring the temperature of the circulating air back to the normal for tenderizing purposes. The red pilot light 35 and heater will remain energized until the circulating air heats to a predetermined temperature, such as 68° F., and will then cut out. The cutting in and out of the heaters and indicating lamp will continue during the first few hours that the cold meat cuts have been acting as refrigerant in the cabinet.

From the balancing or control point 68° F., the internal air temperature will rise very slowly during the remaining processing hours. At the end of the 22 hours processing period, the internal temperature of the beef cuts will be about 68° F., although the air temperature inside the cabinet may reach 72° to 76° F. After the meat has been processed for 22 hours, in accordance with the foregoing schedule, it is removed to a low temperature cooler where it should remain for 12 to 16 hours for chilling and firming purposes, after which time it can be cut in desired sizes for cooking.

Directions for operating the cabinet heretofore described, and practicing a preferred process in accordance with my invention may be as follows:

The unit should be cleaned thoroughly before loading with cuts of chilled beef or other meat. The blower box tray 29 should be supplied with water before each loading. If less than 250 lbs. of beef are to be processed, the tray should contain two fluid ounces of water. If more than 250 lbs. are treated, only one fluid ounce of water is necessary. The cuts of meat should be spaced so as to allow for proper air circulation. The main switch should be turned on and the green pilot light should be operating. The processing time chart, an example of which is illustrated in Fig. 5, should be set and the doors 14 and 15 closed and locked.

All cuts of beef being processed are to remain in the cabinet for 22 hours. Immediately after processing, the beef is to be removed to a cooler having an air temperature between about 35° and 40° F. and chilled until its internal temperature is between 40° and 45° F. This chilling ordinarily takes from about 12 to 15 hours. The green pilot light must remain on during the 22 hours processing period.

The red pilot will cut in when the temperature in the cabinet, as indicated by the thermometer 53, falls below 65° F. and cut out when the temperature rises to 68° F. indicating an energizing and deenergizing of the heaters 28. If, however, the red pilot light remains on while the temperature rises to as high as 90° F., due to some failure in the apparatus, the power should be turned off and the beef removed to a low temperature cooler.

A cabinet as described is designed for processing beef cuts in 22 hours with the beef load varying between a minimum of 200 lbs. and a maximum of 400 lbs. The temperature chart of Fig. 5 shows that the temperature of the meat during the processing may rise from between 35° and 40° F. to about 75° F. in 22 hours, while the air in the cabinet varies from about 65° to 84° F. In the example shown, the outside air temperature varied between 84° and 88° F.

Referring now to the embodiment of my invention illustrated in Fig. 6, there is shown a cabinet 11ª which may be like the cabinet 11 of the preceding embodiment, except that the air conduit on duct 18ª contains two circulating fans 25ª and 54. The fan motors 41ª and 55 are connected to a clock 56, diagrammatically indicated in Fig. 7, so that one fan 25ª may operate for half an hour to circulate the air in one direction and then the other fan 54 may operate for a half an hour to circulate the air in the other direction, in order to provide for more uniform treatment of meat 17ª therein.

Fig. 8 shows a wiring diagram alternative to that of Fig. 7, in that it is proposed to use only one fan, the motor of which is designated at 41ᵇ and reverse it at predetermined intervals by a clock and solenoid 57 so as to run said fan first in one direction and then the other, to vary the circulation of the air through the duct and thereby provide for more uniform treatment of the meat.

The refrigerating apparatus designated as 58 in Fig. 2, if enclosed in the cabinet 11, need only be used if the meat during tenderization tends to rise to undesired high temperatures. It is, therefore, clear that ordinarily no refrigerating means, other than the chilled meat, need be employed. However, if the meat used is either not chilled sufficiently, not enough of it is being tenderized at one time, or the exterior air temperature is abnormally high, the refrigerating apparatus may be used and automatically cut in, like the heating coils 28, if and when the temperature of the air in the cabinet 11 rises above a predetermined point, and cut out when it decreases below a predetermined point.

Although preferred embodiments of my invention have been disclosed, it will be understood that modifications may be made within the spirit and scope of the appended claims.

I claim:

1. The method of treating meat comprising chilling to a normal preserving temperature, enclosing said chilled meat with a sterilizing lamp, circulating air over said sterilizing lamp and meat until tenderized, while using the heat-absorbing capacity of the meat itself, in lieu of other refrigeration, to bring the temperature of the ambient air down to below room temperature, but heating said air when necessary to maintain its temperature above 60° F. and after tenderizing chilling said meat to a normal preserving temperature.

2. The method of treating meat comprising chilling to a normal preserving temperature, enclosing said chilled meat with a sterilizing lamp, circulating air over said sterilizing lamp and meat for about 22 hours, while using the heat-absorbing capacity of the meat itself, in lieu of other refrigeration, to bring the temperature of the ambient air down to below room temperature, but heating said air when necessary to maintain its temperature above 60° F. and then again chilling said meat to a normal preserving temperature.

3. The method of treating meat comprising chilling, after slaughtering, to a temperature between about 35° F. and 40° F. enclosing said meat with a sterilizing lamp and water, circulating the air over said sterilizing lamp, water, and then over said chilled meat, whereby the latter acts as the necessary refrigerant to cool said air to a temperature desired for tenderizing, heating said air when its temperature drops below 65° F. until said temperature rises to 68° F., and after such treatment for about 22 hours, chilling said meat to between about 35° and 40° F.

4. The method of treating meat comprising enclosing the same while chilled to a normal preserving temperature with a sterilizing lamp, circulating air over said sterilizing lamp and meat, whereby the latter acts as the necessary refrigerant to cool said air to a temperature desired for tenderizing, until said meat is tenderized, while heating said air when necessary to maintain its temperature above 60° F. and cooling said air when necessary to maintain its temperature below 68° F., and after tenderizing, chilling said meat to a normal preserving temperature.

5. The method of tenderizing meat comprising enclosing the same while chilled with a sterilizing lamp, energizing said lamp, circulating air over said lamp and over said meat, whereby the latter acts as the necessary refrigerant to cool said air to a temperature desired for tenderizing, heating the ambient air as the temperature thereof decreases below a predetermined point, and discontinuing the heating when said air temperature increases above a predetermined point.

6. The method of tenderizing meat comprising enclosing the same, while chilled to a normal preserving temperature, with an energized germicidal lamp, circulating air over said lamp, part of the time in one direction and the remainder of the time in the other direction, and around said meat, whereby the latter acts as the necessary refrigerant to cool said air to a temperature desired for tenderizing, heating the air if its temperature decreases below a predetermined point, and discontinuing the heating if said air temperature increases above a predetermined point, whereby said air temperature is maintained within the range desired for tenderizing.

LOUIS J. MENGES.

REFERENCES CITED

The following references are of record in the file of this patent:

UNITED STATES PATENTS

| Number | Name | Date |
|---|---|---|
| 2,169,081 | James | Aug. 8, 1939 |
| 2,192,348 | James | Mar. 5, 1940 |
| 2,419,119 | Christensen | Apr. 15, 1947 |

FOREIGN PATENTS

| Number | Country | Date |
|---|---|---|
| 106,865 | Australia | Mar. 23, 1939 |

OTHER REFERENCES

"The Tenderization of Meat" published by the Industrial Fellowship on Meat Merchandizing, Mellon Institute, Pittsburgh, Pa., 1940.